May 6, 1952 N. D. ABBEY 2,596,062
TUBE CUTTING MACHINE
Filed Feb. 18, 1948 8 Sheets-Sheet 1
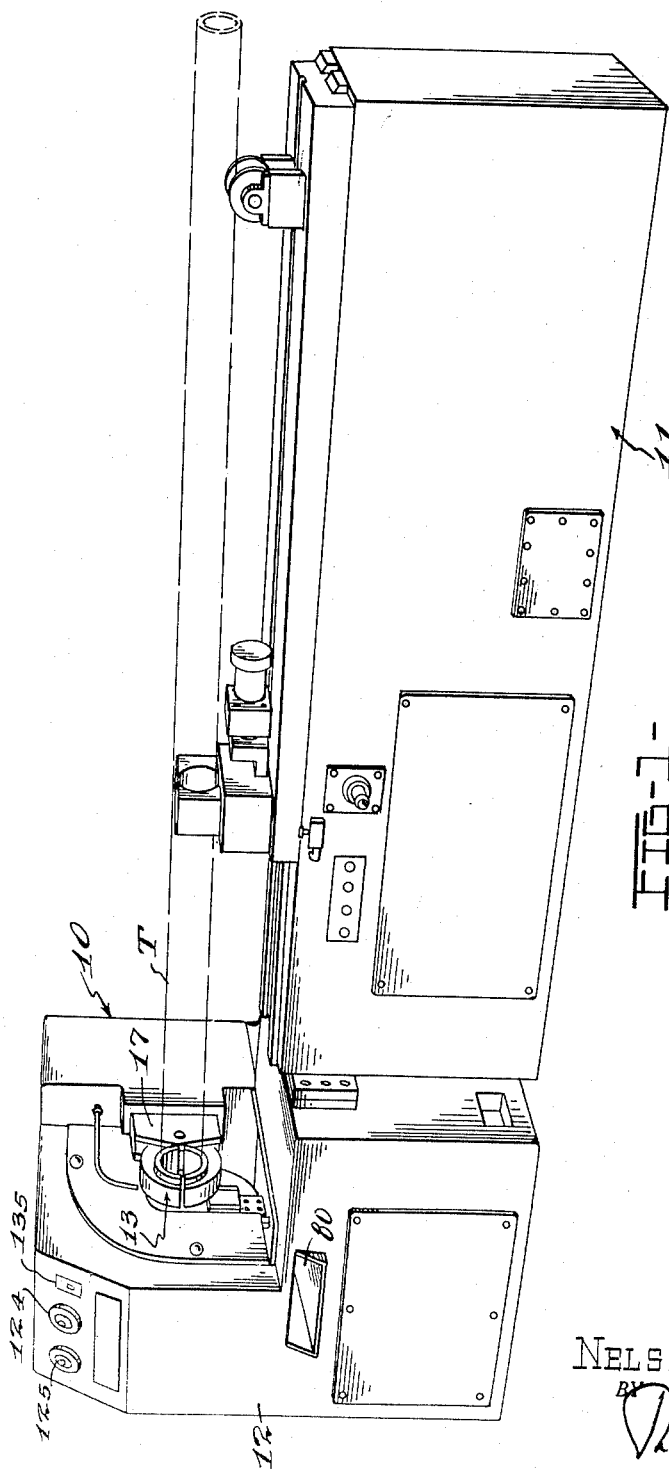
FIG-1-
INVENTOR.
NELSON D. ABBEY
BY
Malcolm W. Fraser May 6, 1952  N. D. ABBEY  2,596,062
TUBE CUTTING MACHINE
Filed Feb. 18, 1948  8 Sheets-Sheet 2
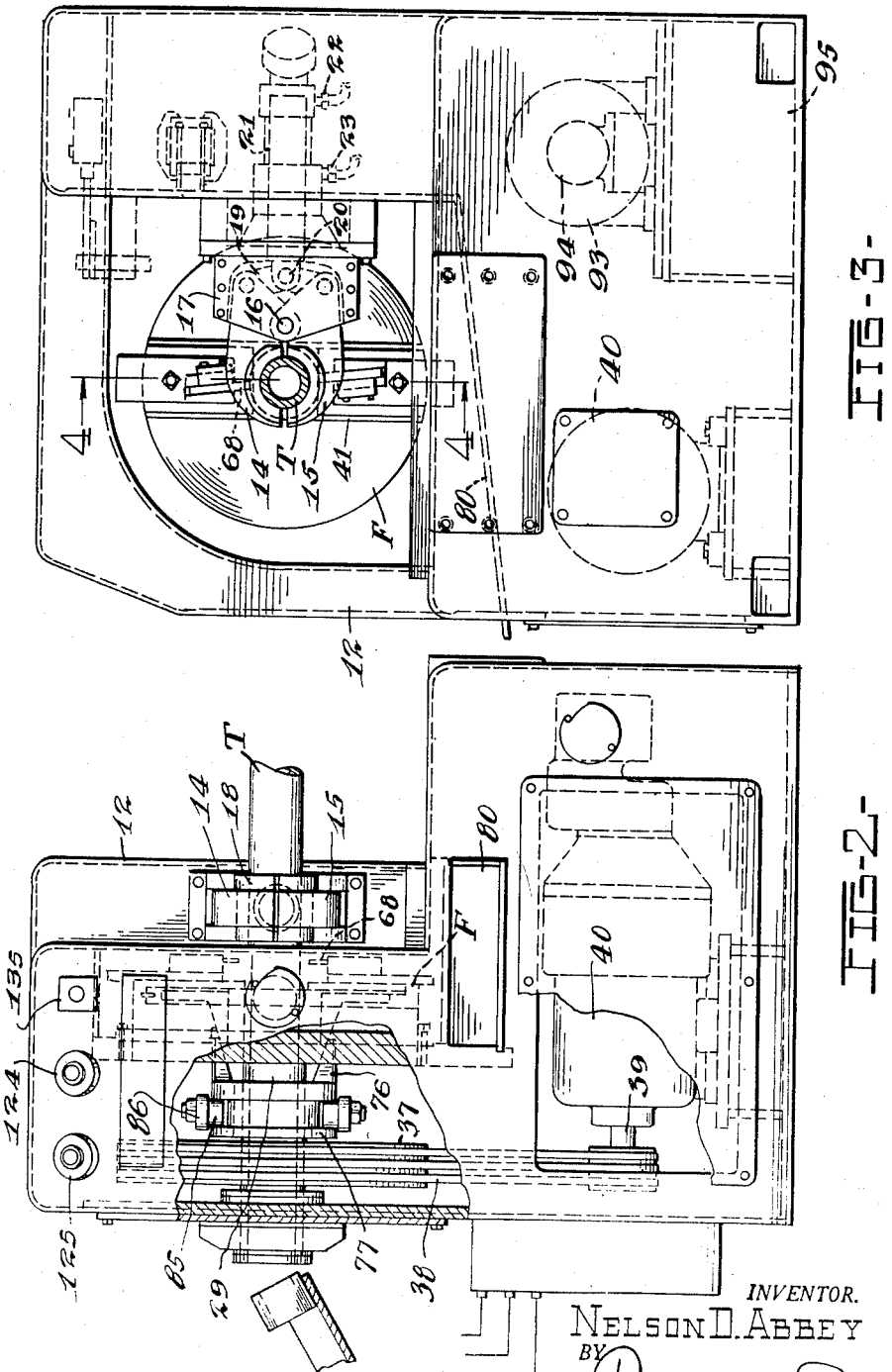
INVENTOR.
NELSON D. ABBEY
BY

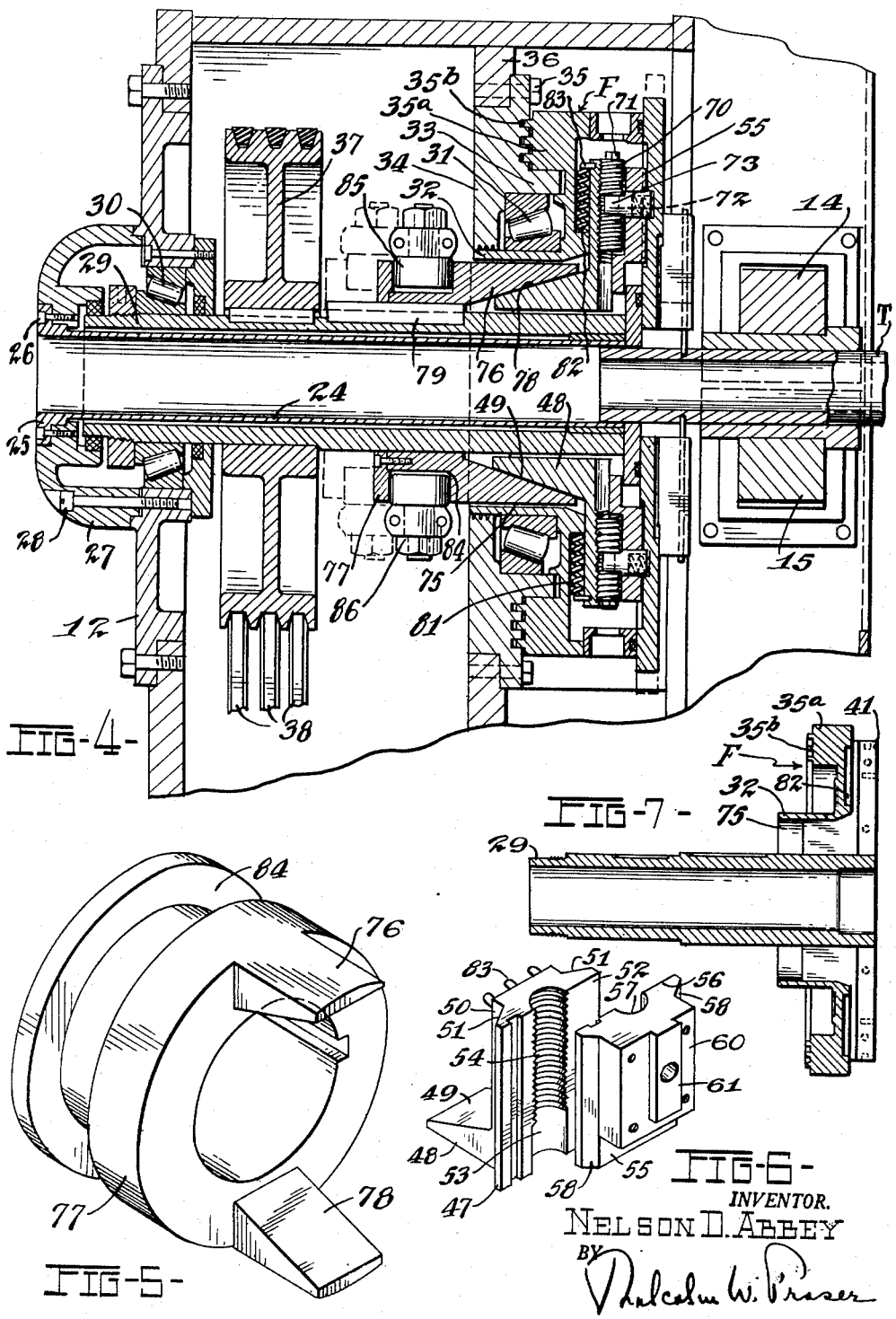

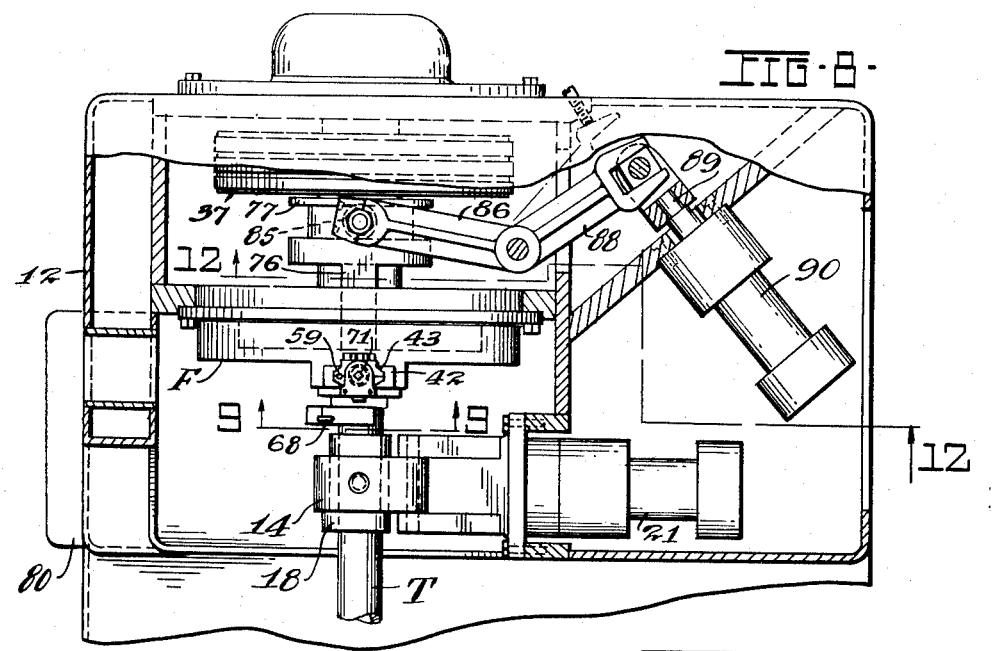
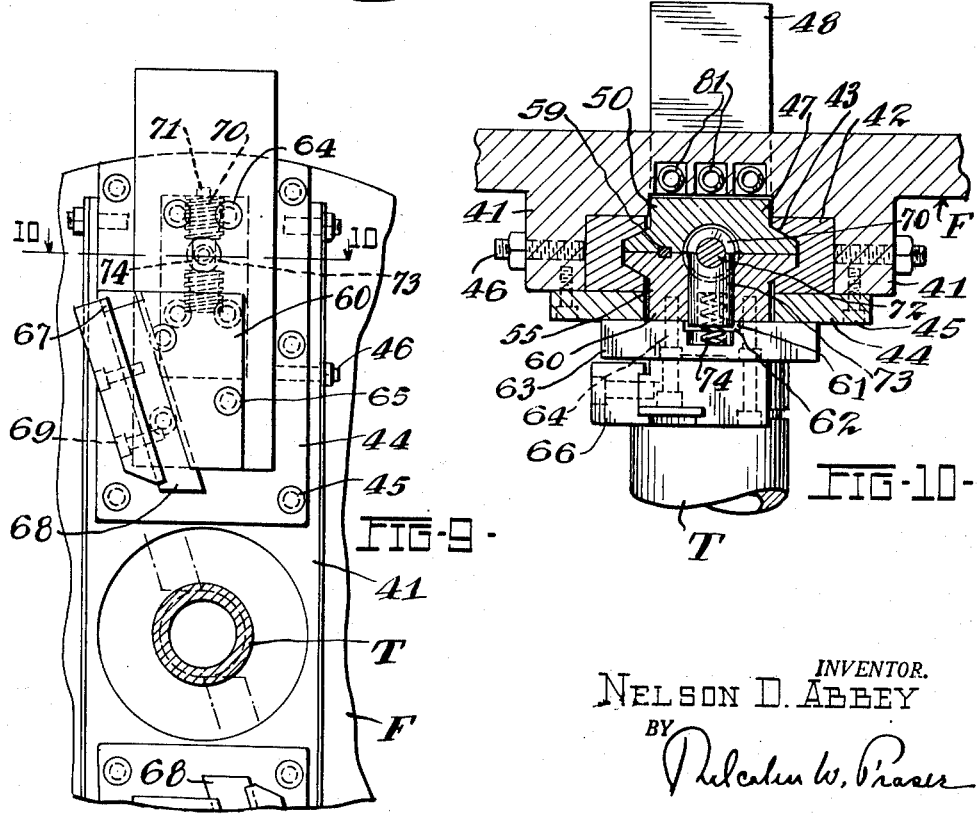

May 6, 1952 N. D. ABBEY 2,596,062
TUBE CUTTING MACHINE
Filed Feb. 18, 1948 8 Sheets-Sheet 5
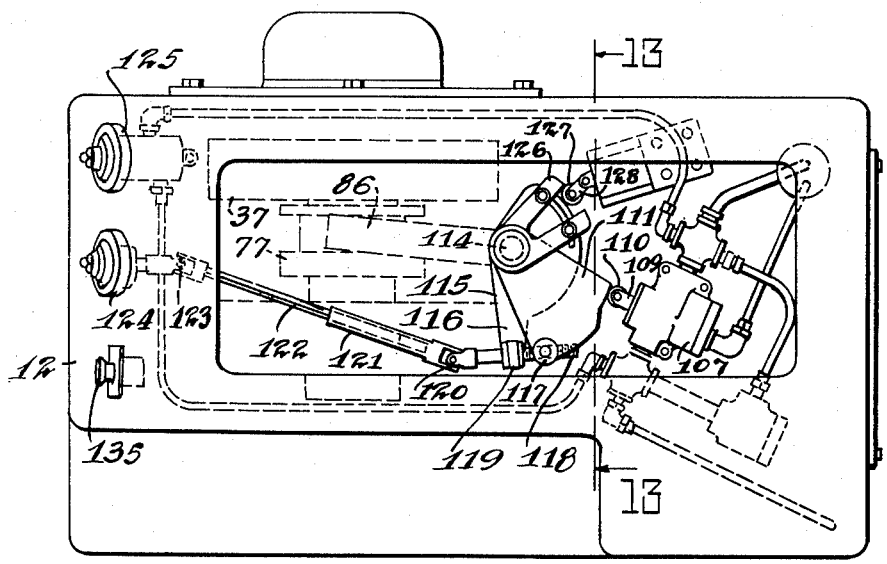
FIG-11-
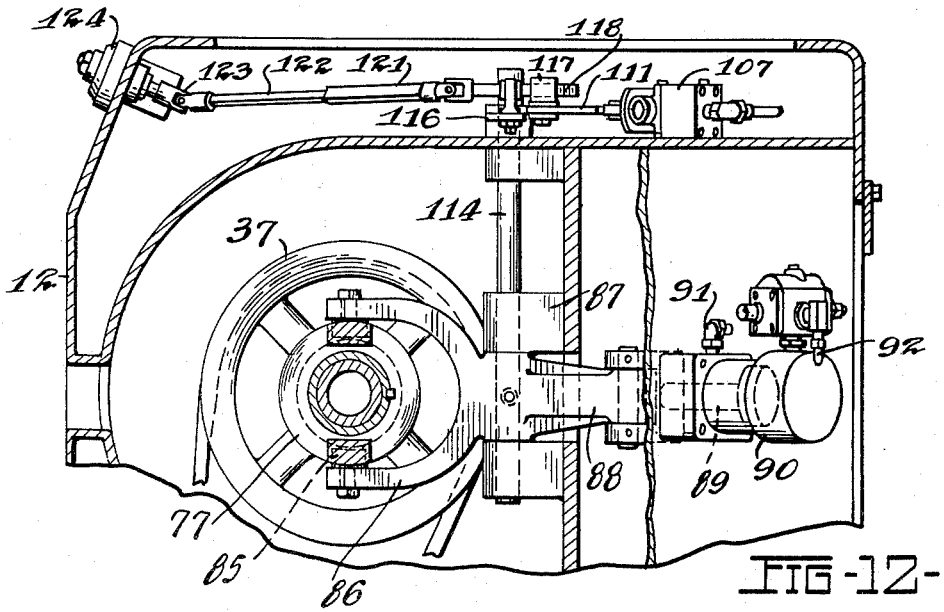
FIG-12-
FIG-13-
INVENTOR.
NELSON D. ABBEY
BY
Malcolm W. Fraser May 6, 1952
N. D. ABBEY
2,596,062
TUBE CUTTING MACHINE
Filed Feb. 18, 1948
8 Sheets-Sheet 6
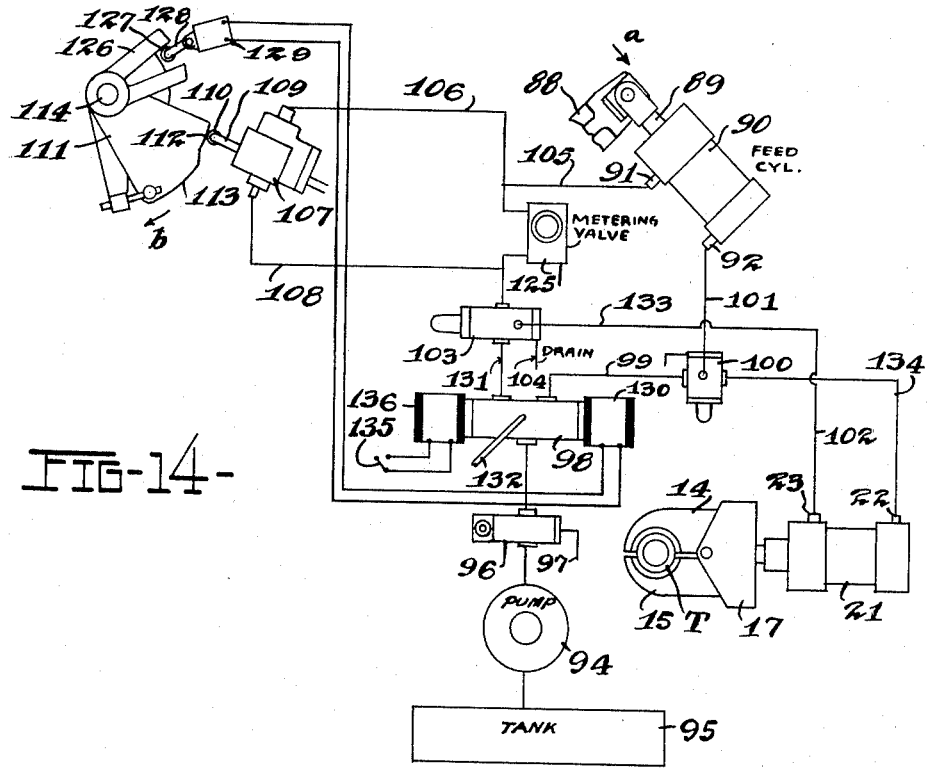
FIG-14-
INVENTOR.
NELSON D. ABBEY
BY

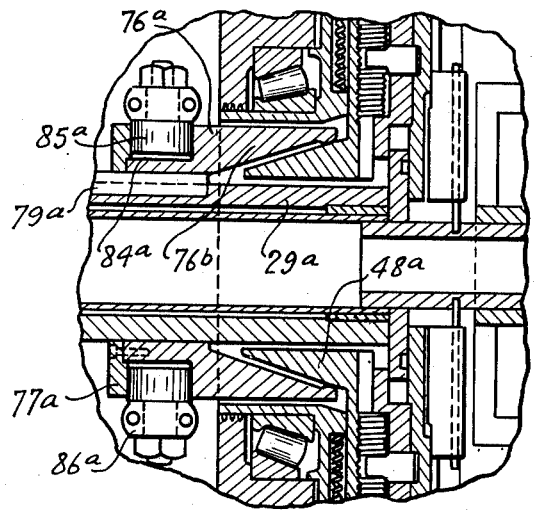
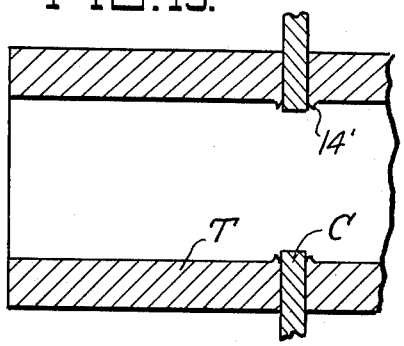
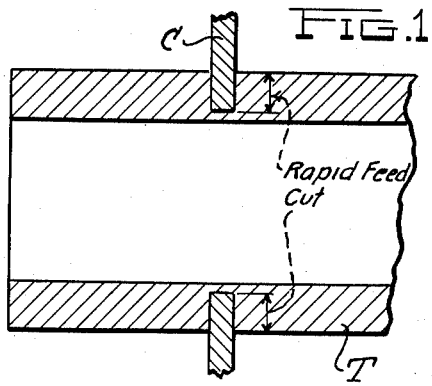
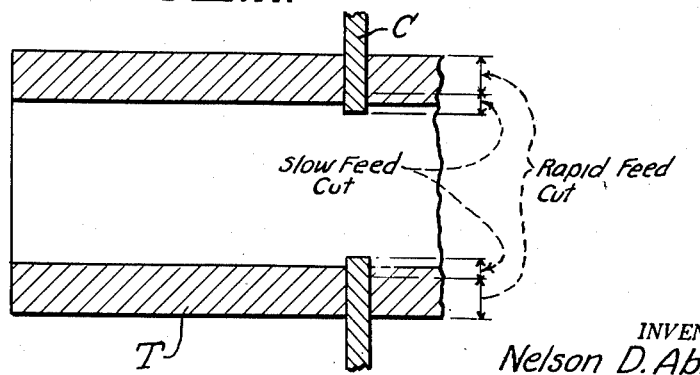

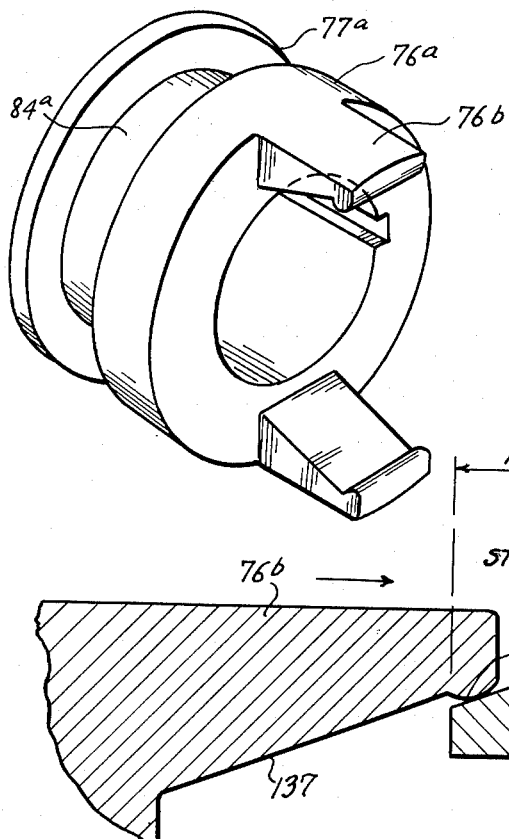
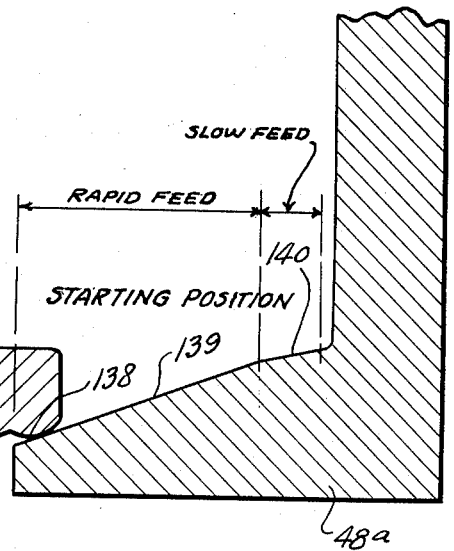
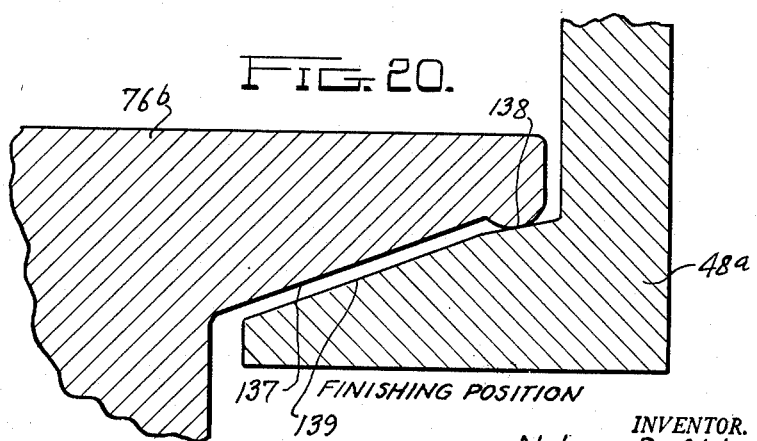

Patented May 6, 1952

2,596,062

UNITED STATES PATENT OFFICE 2,596,062

TUBE CUTTING MACHINE

Nelson D. Abbey, Toledo, Ohio, assignor to The Etna Machine Company, Toledo, Ohio, a corporation of Ohio Application February 18, 1948, Serial No. 9,201

2 Claims. (Cl. 164—60)

This invention relates to tubing machines, but more particularly to machines for cutting tubing into desired lengths.

An object is to produce a tube clamping and cutting mechanism in which the several operating parts function successively in response to hydraulic controls, thereby enabling the operator after proper adjustments have been made, to start the machine in operation so that without further manipulation, the machine successively clamps the tube and severs the same in the desired manner, the severing and clamping mechanism thereupon being successively rendered ineffective automatically, whereupon the machine is ready for the next cycle of operation.

Another object is to produce new and improved manually operated control for regulating the fast and slow movements of the tube cutting tools for readily adapting the machine for different diameter tubes.

A further object resides in providing a machine of the above character with new and improved means for feeding the cutting tools toward and away from the work.

A still further object resides in retarding the working movement of the cutting tool during the final cutting movement, thereby to militate against the forming of burrs or the like normally caused by the relatively rapid tool movement at the end of the tube severing operation.

A still further object is to enable the cutting tool to be moved rapidly to and from the work but to be moved relatively slowly during the cutting operation and to provide the machine with control mechanism which is adjustable to vary the time at which the relatively slow and relatively rapid movements take place.

In one aspect, the invention comprises a tube cutting machine operating under hydraulic controls and hydraulic actuating devices, the machine being so designed that by the actuation of simple controls, the tubing automatically is clamped and held stationary, and successively the cutters operate to sever the tubing and after retraction of the cutting tools, the tubing is unclamped. The machine is then ready for another cutting operation. The cutting tools are rapidly actuated to the work and after the cutting is accomplished, they are rapidly retracted. However, during the cutting operation, the cutting tools move more slowly. By this operation, the tube severing is accomplished as quickly as possible.

Another feature of importance resides in causing the cutting tools to move at a much slower speed during the final severing movement or in other words, just prior to the break through, the working movement of the cutting tools is slowed so that as the tools pass through the walls of the tubing, the liability of the creation of burrs or roughened edges on the inside of the tube is eliminated or greatly reduced.

For purposes of illustration but not of limitation, an embodiment of the invention is shown on the accompanying drawings in which Figure 1 is a perspective view of the machine for clamping and cutting tubing, the same being shown in association with a tube feeding mechanism which, however, forms no part of the present invention;

Figure 2 is a side elevation with some parts broken away, of the tube clamping and severing mechanism;

Figure 3 is an end elevation of the machine into which the tubing is fed;

Figure 4 is an enlarged longitudinal sectional view on the line 4—4 of Figure 3;

Figure 5 is an enlarged perspective view of the cutting tool actuating collar;

Figure 6 is a composite view in perspective showing the two parts to which the tool carrier is connected and which cooperate with the tool actuating collar;

Figure 7 is a longitudinal sectional elevation of the cutting tool holder and operating spindle therefor;

Figure 8 is a top plan view of the machine with parts broken away to show the relation of the clamping and tool feeding mechanisms;

Figure 9 is an enlarged transverse sectional view substantially on the line 9—9 of Figure 8, showing the tool holders and associated parts;

Figure 10 is an enlarged transverse sectional view on the line 10—10 of Figure 9;

Figure 11 is a top plan view of the machine showing the adjustable cam controlling device governing the movement of the cutting tools;

Figure 12 is a vertical sectional view substantially on the line 12—12 of Figure 8;

Figure 13 is a vertical sectional view on the line 13—13 of Figure 11;

Figure 14 is a diagrammatic view showing the hydraulic system for the tube clamping and the tube severing mechanisms;

Figure 14A is a fragmentary longitudinal sectional view of an alternate form of machine showing the tube cutting mechanism by which the cutting tools first move rapidly and then upon the approach of the final cutting operation, move slowly;

Figure 15 is a longitudinal sectional view of a fragment of a tube showing the result achieved by cutting tools which have moved rapidly to effect the cut and illustrating the burrs or flanges created thereby;

Figure 16 is a fragmentary sectional view of a tubing showing the cutting tools which have completed their rapid cutting operation and indicating the portion still to be cut and during which the cutting tools are fed slowly;

Figure 17 is a view similar to Figure 16 showing the tube after it has been cut without the formation of burrs or sharp edges;

Figure 18 is a perspective view of the spool or collar carrying the wedge elements for effecting the rapid and slow feed of the cutting tools;

Figure 19 is an enlarged sectional view showing portions of the wedge elements and their operative relation for effecting the rapid and slow tool feed of the cutting tools, the parts being shown at the commencement of the tool feeding operation; and Figure 20 is a view similar to Figure 19, but showing the position of the parts at the end of the feeding movement of the cutting tools.

This application constitutes a continuation in part of my application Serial No. 608,885, now Patent 2,484,601 entitled "Tube Clamping and Severing Machine."

The illustrated embodiment of the invention comprises a machine for cutting metal tubing or severing a length of tubing into predetermined shorter lengths and consists in general of mechanism which operates first to clamp or hold the tube in stationary position and while the tube is so held, to sever the walls of the tube. As shown on Figure 1, the machine is indicated at 10 and in advance of such machine is a tube feeding machine 11 by which the tube may be recurrently advanced to sever from a continuous length of tubing, sections of predetermined length. However, the tube feeding mechanism 11 forms no part of the present invention and further described thereof is not considered necessary.

The machine 10 consists of a housing 12 within which the operating parts are housed except for the tube clamping jaws which are generally indicated at 13, these operating firmly to grip the tubing and hold it in stationary position during the cutting or severing operation as will hereinafter appear. Referring particularly to Figure 3, the tube clamping mechanism comprises a pair of complementary clamping jaws 14 and 15 which are pivoted intermediate their ends upon a shaft 16 carried by a bracket 17 which is horizontally disposed and projects from a portion of the housing 12. It will be observed that each of the jaws 14 and 15 have semi-cylindrical projections 18 on opposite sides in order to grip a substantial portion of the tubing.

The clamping jaws 14 and 15 are rocked to and from tube clamping position by a toggle 19, the outer ends of the toggle links being pivoted respectively to the inner ends of the jaws 14 and 15 and the center of the toggle being pivotally connected to the forward end of a piston rod 20. The piston rod 20 has a piston (not shown) at its inner end which is mounted for reciprocatory movement within a cylinder 21. Fittings 22 and 23 are provided respectively at the outer and inner ends of the cylinder 21 to admit liquid under pressure to one side or the other of the piston for moving the piston rod 20 in one direction or the other. Manifestly, when the piston rod 20 moves to the right of Figure 3, the clamping ends of the jaws 14 and 15 are rocked away from each other to release the tube and when the piston rod 20 is moved to the left of Figure 3 whereupon the toggle 19 is straightened out, the clamping ends of the jaws 14 and 15 are moved into operative clamping position and securely held in such position by hydraulic pressure as will hereinafter more fully appear.

As the description proceeds, it will be manifest that after a sufficient length of tubing has been delivered to the machine, the clamping jaws 14 and 15 are first moved into operative position rigidly to clamp the tubing and hold it stationary preparatory to the cutting or severing operation, tubing being introduced into the machine from the right-hand side (Figure 1) and extending as far through as required for the severed tube section. As shown on Figure 4, the tubing T is clamped in position by the clamping jaws 14 and 15 and the forward end thereof extends into an elongate stationary liner tube 24. The outer end of the liner tube 24 is provided with an annular flange 25 through which bolts 26 extend for securing the liner flange to a cap 27 which in turn is secured by bolts 28 to the housing 12.

Disposed outside of the stationary liner tube 24 and rotatable thereabout is an operating spindle 29 which is mounted for rotation within the housing 12 on anti-friction thrust bearings 30 and 31. One race of the bearing 31 is mounted on a collar portion 32 which is an integral portion of an annular spindle flange F, the flange being in turn an integral part of the spindle 29. The other race of the bearing 31 is mounted on the tubular part 33 of a ring plate 34 which is secured by bolts 35 to a bracket 36 rigid with the housing 12. The spindle flange F has an inwardly extending annular projection 35a which rotates on the outer face of the ring 33 and is formed with a series of ring-like ribs 35b which rotatably fit grooves formed in the ring plate 34 thereby to provide an oil seal between these relatively rotating parts.

Keyed to the spindle 29 is a sheave 37 which is driven by V belts 38 from a sheave 39 mounted on the armature shaft of an electric motor 40 (Figure 2). It will thus be apparent that the spindle 29 is constantly driven by the electric motor 40 and as will hereinafter appear, the cutting tools are moved to and from the work while the spindle is rotating.

As shown on Figure 10, the spindle flange is formed with two pairs of spaced radially extending ribs 41 and fitting on the inside of each of the ribs 41 is a gib 42 and each gib is formed on its inner face with a substantially V-shaped groove 43. Each gib is held in place by a plate 44 which is secured in place by a series of bolts 45. The gibs may be adjusted toward and away from other by set screws 46.

In each pair of gibs 42 is a tool holder assembly mounted for radial reciprocatory movement for moving the cutting tools to and from the work. The tool holder assembly comprises an elongate wedge carrying member 47 (Figure 6) provided with an integral wedge or cam 48, the upper surface 49 of which tapers outwardly from the free end. The wedge 48 projects at substantially right angles from the lower end of the member 47 and integral therewith is substantially rectangular boss 50. Flaring outwardly from the inner portion of the boss 50 are tapered guide surfaces 51 which have sliding contact with the inner side of the V-shaped grooves 43 of the gibs 42 (Figure 10). The inner face 52 of the wedge carrying member 47 is flat except for a centrally disposed longitudinally extending semi-circular groove 53 which is formed with screw threads 54.

A plate member 55 is adapted to abut against the flat inner face 52 of the wedge carrying member 47 and is likewise provided with a flat face 56 and a central longitudinally extending semi-circular groove 57 which cooperates with the groove 53 and is of similar conformation so that when the two parts are in place, a circular hole is provided for the reception of an adjusting screw as will hereinafter appear. The groove 57 is smooth and free of screw threads.

The plate member 55 is also provided on opposite sides with tapering guide surfaces 58 which engage the outer side of the V groove 43 of the gibs 42. A key 59 (Figure 10) interposed between the wedge carrying member 47 and the plate 55, militates against lateral movement of these parts during operative radial movement thereof.

Formed on the outer face of the plate 55 is a boss 60 and projecting outwardly from the central portion of the boss 60 is a longitudinally elongate substantially rectangular guide key 61 which fits into an elongate groove 62 in an adapter plate 63 which is secured to the boss 60 by screws 64.

Secured to the adapter plate 63 by screws 65 is a tool holder 66 which is formed with an angularly disposed guideway 67 to receive the cutting tool 68, the latter being adjustably secured in the desired position by screws 69 (Figure 9).

From the above description, it will be manifest that the tool holder assemblies (two assemblies being arranged in diametrically opposed relation to operate against opposite sides of the tube) are radially movable as units toward and away from the tube to be severed, these assemblies sliding in gibs which are carried by and rotate with the spindle flange F. Initial adjustment of each of the above tool holder assemblies may be effected by an adjusting screw 70 which has a squared upper end 71 to receive a suitable wrench. The screw 70 fits in the complementary grooves 53 and 57 and engages the screw threads 54 formed in the groove 53. An intermediate portion of the screw has a smooth reduced neck 72 to receive the forked end of a key member 73 which extends through the plate member 55 (Figure 10) and is yieldingly urged into engagement with the screw by a coil spring 74. The inner end of the spring 74 seats in a socket formed in the adapted plate 63.

It will be evident that by adjusting the screw 70, the tool holder may be adjusted radially inwardly or outwardly as desired relative to the wedge carrying member 47. In this manner, initial adjustment of the tools with respect to the tube to be served may readily be effected.

As particularly indicated in Figure 7, the spindle flange F is formed in the region of the spindle 29 with a pair of oppositely arranged substantially rectangular shaped guide openings 75 and into the lower portion of each of these openings from the outer side thereof, extends the cam or wedge 49 on the wedge carrying member 47 of the tool holder assembly. Also extending into each of the openings 75 but from the inner side thereof, is a wedge member 76 which is integral with a collar 77 slidable along the spindle 29 but secured for rotation thereto by a key 79. The wedge member has a pair of diametrically opposed wedge fingers, one for each tool holder assembly. The inner face of the finger of each wedge member 76 is formed with a cam surface 78 which is in sliding contact with the cam surface 49 of the adjacent wedge member 48.

It will be manifest that by movement of the collar 77 to the right of Figure 4, the tool holder assemblies will be concomitantly moved radically in a direction toward the tube T to be severed, such movement being sufficient to cause the revolving cutting tools 68 to cut through the wall of the tube T to effect the severing operation. The chips resulting from the cutting operation fall into a chute 80 (Figures 2 and 3) which leads to the outside of the machine.

Movement of the collar 77 to the left of Figure 4 releases the wedges 48 of the tool carrying assemblies which are retracted away from the work to their normal inoperative position by coil springs 81, the lower ends of which seat upon a shoulder 82 formed in the spindle flange F and the upper ends of which abut against flattened surfaces on pins 83 which are fixed to the upper ends of each of the wedge carrying members 47 of the tool assembly.

The collar 77 with which the wedges 76 are integral, is formed with an annular groove 84 to receive rolls 85 carried by the arms of a yoke 86 which is mounted in brackets 87 on a portion of the housing. Forming a part of the yoke 86 is an arm 88 to which is pivotally connected the piston rod 89 which has a piston (not shown) operating in a feed cylinder 90. Fittings 91 and 92 are adapted to deliver liquid under pressure to opposite ends of the cylinder for driving the piston therein in one direction or the other, thereby to impart movement of the collar 77 in one direction or the other axially of the spindle shaft 29.

As above pointed out, both the tube clamping mechanism and the tube severing mechanism are hydraulically operated and for this purpose, an electric motor 93 drives a suitable pump 94 which communicates with an oil reservoir or tank 95. Referring to Figure 14, the pump 94 pumps the oil or other suitable liquid from the tank 95 first to a pressure regulating valve 96 of any suitable design such as to maintain the oil pressure within the line at a predetermined point relieving any excess pressure and allowing liquid thereby to return through a tube 97 to the tank 95. From the pressure regulating valve 96, oil passes to a double solenoid valve 98 and in the normal operation of the machine, liquid passes through a tube 99 from the valve 98, through a valve 100 to the outer end of the clamping cylinder 21 through the fitting 22 thereby causing the clamping jaws 14 and 15 to operate as above described, and securely clamping in a rigid manner the tube to be severed. After the clamping operation has been accomplished and pressure builds up in the valve 100, liquid under pressure passes through the tube 101 through the fitting 92 to the outer end of the feed cylinder 90, forcing the piston therein outwardly of the cylinder and thereby causing the wedge carrying collar 77 to move to the right of Figure 5 to move the cutting tools into operative position as above explained.

It will be evident that when the piston and the clamping cylinder 21 moves to the left of Figure 14 to move the clamping jaws 14 and 15 into clamping position, the liquid in advance of the piston is forced from the forward end of the cylinder through the fitting 23 and into the line 102 to a sequence valve 103 and thence to the tank through a tube 104. It will also be understood that liquid in advance of the piston operating in the feed cylinder 90 is forced through the fitting 91, through the tubes 105, 106, through the valve mechanism 107, through the tube 108 to the sequence valve 103 from which it returns to the tank through the tube 104.

As will hereinafter appear, the piston rod 89 operating in the feed cylinder 90 moves with relative rapidity to a certain predetermined point of its travel and thereafter moves relatively slowly, which movement corresponds to the feeding movement of the cutting tools into the tube to be severed. It will be manifest from the above description that the oil in advance of the piston operating in the feed cylinder 90 has relatively free passage through the tubes 105, 106 through the valve mechanism 107, tube 108 to the return or drain tube 104. The valve mechanism 107 is closed in a controlled manner so that further passage of oil therethrough from the tube 106 to the tube 108, is prevented. It will be observed that the valve mechanism 107 includes a valve control stem 109 on the outer end of which is a roller 110. The stem reciprocates and in the inward position operates to close the valve thereby to shut off the flow of liquid from the tube 106 to the tube 108 and in the outward position such as indicated on Figure 14, the valve is open, establishing communication between these tubes. The valve stem 109 is urged outwardly by any suitable spring (not shown) so that the roller constantly engages a cam sector 111. The cam sector has a relieved portion 112 adjacent one end thereof and a raised portion 113 contiguous to the relieved portion.

The cam sector 111 is rotatably mounted on a shaft 114 (Figure 12) which is fixed to and rotatable with the yoke 86 which actuates the wedge carrying collar 77. Fixed for turning movements with the shaft 114 and mounted directly beneath the cam sector 111 is an operating plate 115 which has a laterally extending arm 116. Mounted on a rearward edge portion of the cam sector 111 is a bracket 117 which is screw-threaded threadedly to receive an adjusting stem 118. The inner end portion of the stem has a collar 119 which is disposed between the forked end of the arm 116 of the plate 115. The inner end of the adjusting stem 118 is connected by a universal joint 120 to a sleeve 121 with which a rod 122 telescopes. The telescoping portions of the rod 122 and the sleeve 121 are such that turning movement of the rod 122 imparts turning movement to the sleeve 121.

The rod 122 is connected by a universal joint 123 to the stem of an adjusting dial 124. It will be manifest that by turning the dial 124 in one direction or the other, the adjusting stem 118 is turned to effect rotative adjustment of the cam sector 111 with respect to the plate 115. In this manner, the time at which the valve actuating stem 109 is actuated is controlled. Manifestly, when the roller 110 engages the relieved portion of the cam sector 111, the valve and valve mechanism 107 is open allowing free flow of liquid under pressure therethrough but as soon as the roller engages the raised portion 113 of the cam sector, the valve actuating stem 109 is depressed, thereby closing the valve and preventing flow of liquid through the valve mechanism 107.

Manifestly, the plate 115 which rotates with the shaft 114 and the cam sector 111 oscillate together, the sleeve 121 sliding along the rod 122 during such movement.

Whenever the valve and valve mechanism 107 is closed in response to the operation of the cam sector 111, liquid in the forward end of the feed cylinder 90 then by-passes from the tube 105 to the sequence valve 103 through a metering valve 125 which can be adjusted to control the flow of liquid therethrough. The purpose of the metering valve is to control the speed of the relatively slow movement of the piston rod 89 during the final movement thereof and at the time when the cutting tools are performing their cutting operation. Metering valves of this type are old and well-known in the art as are the remaining valve mechanisms above mentioned and are available on the market, such, for example, as well-known "Vickers" valve mechanisms. Detail illustration and description are not considered necessary because they are well-known to those skilled in this art.

From the above description, it will be understood that the clamping mechanism and tube severing mechanism operate in sequence and that the movement of the clamping tools to the work and during the cutting operation are readily controllable thereby conveniently to adapt the machine for different size tubes and for top walls of varying thicknesses.

After the cutting operation has been completed, the cutting tools are first retracted from the work and hereafter the tubing is unclamped or released. Such retracting and releasing operations are controlled by a pair of fingers 126 which are mounted on the yoke shaft 114 (Figures 11 and 14). Interposed between the pair of fingers 126 is a roller 127 carried by a switch arm 128 which is part of the switch mechanism 129. The switch 129 is electrically connected to a solenoid 130 which is one of the solenoids forming part of the double solenoid valve 98. Thus, upon counterclockwise movement of the arms 126 (Figure 14) a predetermined extent sufficient so that one of the arms rocks the switch arm 128 to energize the solenoid 130, the valve therein is thereupon shifted so that the pump 94 may then force liquid into the tube 131 to the sequence valve 103. From the sequence valve 103, liquid flows freely through the tube 108, valve mechanism 107, tubes 106 and 105, to the feed cylinder 90 through the fitting 91, and thus operates the mechanism to enable the cutting tools to return to their normal inoperative position.

The valve mechanism 107 is such that there is always a free flow of liquid possible from the tube 108 to the tube 106 irrespective of the position of the controlling stem 109. The liquid in rear of the piston within the feed cylinder 90 is forced therefrom through the fitting 92, tube 101, through the valve 100, tube 99, to the double solenoid valve 98 which is then in position to allow the liquid from the tube 99 to pass through the tube 132 to the tank 95.

After sufficient pressure has been built up in the sequence valve 103 and which takes place after the cutting tools have completed their retracting movement, liquid passes from the sequence valve 103 through the tube 133, through the fitting 23 to the rearward end of the clamping cylinder 21 to force the piston therein to the right of Figure 14 and cause the clamping jaws 14 and 15 to move apart to their unclamped positions. At this time, liquid from the cylinder 21 is then forced therefrom through the fitting 22, tube 134, through the valve 100 and to the tube 99, and thence to the drain 132 leading from the double solenoid valve 98.

When the above operation has substantially been completed, one of the fingers 126 will have tripped the valve lever 128 to deenergize the solenoid 130.

The above completes the cycle of operation and for the machine again to be rendered effective for tube cutting operation, a control button 135 (Figure 11) must be operated. The control button 135 is electrically connected to the solenoid 136 which constitutes the other solenoid of the double solenoid valve 98 and energization of the solenoid 136 causes the valve therein to operate to enable the pump 94 again to force liquid under pressure to the tube 99 as hereinbefore described. It should be understood that in the normal position forming a part of the double solenoid valve 98, the tube 131 is closed to trap liquid therein and in the tubes associated therewith, to militate against the admission of air therein. It is found that air bubbles in the system militate against uniform operation of the members and particularly is disadvantageous in respect of the feeding movement of the tool assemblies in response to the tube feeding movement of the piston within the feed cylinder 90.

Referring to Figures 14A to 20, an alternate form of tool feeding mechanism is illustrated in which the tool or cutting instrument is rapidly traversed to the work as above described, but in addition is moved at a relatively rapid rate to effect cutting through the major portion of the tube walls but just prior to the final break through or severing operation, the tool is moved at a relatively slow rate, thereby to obviate the formation of burrs or sharp edges normally incident to tube cutting operations. After the tubing has been severed, the cutting tool is rapidly retracted. As shown, a wedge member 76ª is provided with a pair of laterally extending integral fingers 76ᵇ, which are in diametrically opposed relation, one finger being provided for each of the cutting tools.

The wedge member 76ª is integral with a collar 77ª, which is slidable axially along a spindle 29ª but is secured for rotation to the spindle by an elongate key 78ª. Formed in the collar 77ª is an annular groove 84ª to receive rollers 85ª, which are carried by a yoke 86ª. The yoke 86ª operates in the same manner and by the same mechanism described in connection with the yoke 86. The outer surface of each of the fingers 76ᵇ is plain and flush with the peripheral surface of the collar 77ª but the under surface 137 of each finger tapers upwardly from the collar, the larger portion being adjacent the collar. Near the outer or free end portion of each finger is a rounded actuating surface 138, which slidably engages an upwardly inclined cam surface 139 of the respective wedge member 48ª forming part of the tool holder assembly, each wedge member 48ª, except for the cam surface, being identical with the wedge member 48 hereinbefore described.

It will be observed that the cam surface 139 tapers upwardly rather gradually, an angle of the order of 70° to the vertical being satisfactory. The cam surface 139 merges into another upwardly inclined contiguous cam surface 140, the length of which is less and the angularity of which is somewhat less than that of the cam surface 139. For example, the angularity of the cam surface 140 may be of the order of 75° to the vertical.

The collar 77ª operates in the same manner as the collar 77 above described, in that at the proper time, it is shifted axially to the right of Figure 14A, whereupon the rounded actuating surface of each of the wedge fingers 76ᶜ slides along successively the inclined or cam surfaces 139 and 140. The angularity of the cam surfaces 139 is such as to actuate the cutting tool at a relatively rapid rate to effect cutting of the major portion of the tubing walls. It will be recognized that the angularity of the cam surfaces 139 is of the order of the cam surface 78 hereinbefore described. However, in view of the relieved cam surface 140, which is at a less abrupt angle, the final movement of the cutting tool is materially decelerated so that during the movement of the rounded actuating surfaces 138 along the cam surfaces 140, the cutting tool moves at a relatively slow rate.

Figure 19 of the drawing somewhat diagrammatically shows the position of the parts at the start of the cutting tool movement, the rapid feed being indicated throughout the extent of the cam surfaces 139 and the slow feed being indicated throughout the cam surfaces 140. Manifestly since the collar 77ª is retracted or moved to the left of Figure 14A at a rapid rate, the tools are spring-retracted rapidly as hereinbefore described, the differences in angularity of the cam surfaces 139 and 140 being of importance during the cutting movement of the tools.

The above described structure is advantageous in overcoming difficulties heretofore encountered in the cutting of tubing, because usually where the cutting tool passes at a relatively rapid rate through the walls of the tubing, it leaves sharp burrs or roughened portions, which must later on be filed or ground off. This is illustrated in Figure 15 in which the tools C have cut through the walls of the tubing T at a relatively rapid rate and form the sharp burrs 141 created by causing the metal to flow inwardly. This is quite objectionable and in order to provide the desired smooth interior for the tubing, added expense is incurred in removing these burrs. As shown in Figure 16, the tools C are advanced rapidly through the major portion of the cutting operation. However, just prior to the break through or the final severing operation, the tools C are advanced relatively slowly and, as indicated in Figure 17, the break through of the tools is sufficiently slow as to eliminate or greatly reduce the formation of the burrs above described. Thus a finer rate of tool feed is effected just prior to the time when the tools break through the walls of the tubing.

From the above description, it will be manifest that I have produced an extremely practical and efficient machine by which tubing may be cut or severed. To perform such operation, it is merely necessary to energize the hydraulic system whereupon the tubing is first clamped, then the cutting is performed, the cutting tools being moved to inoperative position before the tubing is released or unclamped. Thereupon, the hydraulic system is automatically rendered ineffective and in order to start the machine to perform its work, the starting control must be manipulated. The movement of the cutting tools with respect to the work is regulated simply by adjusting a dial conveniently located on the machine, thereby enabling as rapid accomplishment of the work as can be efficiently achieved. Thus the machine can be adapted to work on tubes of different diameters, the tube liner being replaceable without difficulty to accommodate larger or smaller tubing. Another feature of cardinal importance resides in the control of the cutting tools in such manner that they move at a relatively rapid rate until just prior to the break through, at which time they move at a relatively slow rate, thus to obviate the creation of sharp burrs projecting interiorly of the tubing.

What I claim is:

1. A tube cutter comprising a support, a tube channel on said support, a head rotating coaxially about said tube channel, means for rotating said head, a plurality of cutting tools, carriers mounting said cutting tools on said head and rotating therewith, said carriers being moveable radially inwardly and outwardly on said head for moving said tools inwardly and outwardly with respect to the tube channel, spring means operatively engaged between said head and carriers for positively biasing the latter outwardly, said carriers having cam members on inner ends thereof, said cam members being substantially concentrically disposed about said tube channel and extending from the inner ends of said carriers axially of said tube channel, said cam members being substantially wedge-shaped in cross-section with the wide ends of the wedges respectively lying at the inner ends of said carriers and with outwardly disposed cam surfaces, a plurality of substantially wedge-shaped cam-engaging fingers concentrically disposed exteriorly of said cam members, said fingers having inwardly disposed inclined surfaces respectively opposite said cam surfaces, said fingers being mounted on said support for axial movement along the cam surfaces whereby to move said carriers, said cam surfaces of said members each having a first portion of relatively steep inclination adjacent the narrow end thereof and a second portion of relatively lesser inclination adjacent the wide end thereof, fluid-motor and control means therefore for advancing said fingers first rapidly along part of said first cam surface portion and thence relatively slowly and steadily along the remainder of said first cam surface portion and then along said second cam surface portion, each of said fingers having an inwardly disposed projection substantially at the free ends thereof for slidingly engaging said cam surfaces, whereby to space the inclined surfaces on said fingers from the cam surfaces on said cam members.

2. A tube cutter as claimed in claim 1, the first portions of said cam surfaces having an inclination of the order of 70° and the second portions of said cam surfaces having an inclination of the order of 75°.

NELSON D. ABBEY.

REFERENCES CITED

The following references are of record in the file of this patent:

UNITED STATES PATENTS

| Number | Name | Date |
|---|---|---|
| 1,433,320 | Wersel | Oct. 24, 1922 |
| 1,765,208 | Cunningham | June 17, 1930 |
| 2,069,107 | Groene et al. | Jan. 26, 1937 |
| 2,122,204 | Gora | June 28, 1938 |
| 2,262,049 | Robinson | Nov. 11, 1941 |
| 2,285,069 | Vickers | June 2, 1942 |
| 2,342,246 | Brueckner | Feb. 22, 1944 |
| 2,373,472 | Haumiller | Apr. 10, 1945 |
| 2,382,020 | Nesbitt | Aug. 17, 1945 |
| 2,484,601 | Abbey | Oct. 11, 1949 |